March 2, 1948.    H. E. WHEELER ET AL    2,437,215
FOOD LOCKER
Filed Feb. 26, 1945    2 Sheets-Sheet 1

Inventors
Harold E. Wheeler
and David A. Forberg
By Spencer, Margall, Johnston & Cook,
Attys.

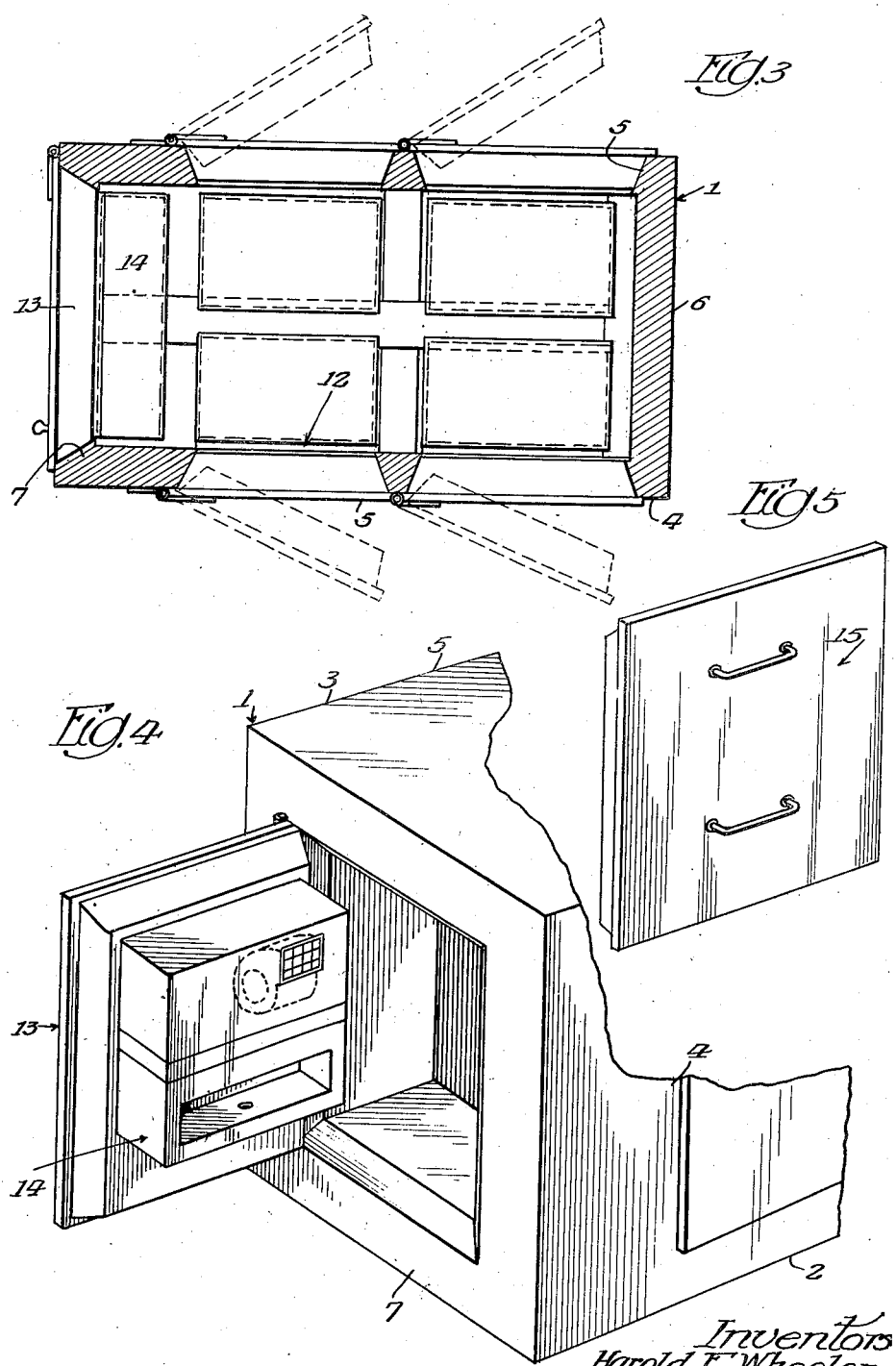

Patented Mar. 2, 1948

2,437,215

UNITED STATES PATENT OFFICE 2,437,215

FOOD LOCKER

Harold E. Wheeler, Chicago, and David A. Forberg, Des Plaines, Ill.

Application February 26, 1945, Serial No. 579,854

4 Claims. (Cl. 62—102)

This invention relates to a food locker in general and particularly to a freezer cabinet of the locker type whereby low temperatures are maintained. More specifically, the invention relates to a low temperature freezer embodying a plurality of adjacently located superimposed containers for food stuffs which are adapted to be maintained in frozen condition.

Certain commercial low temperature freezer or storage cabinets are now on the market but some of these freezers allow access to the compartments only through a room which is maintained at an exceedingly low temperature thereby making it inconvenient and undesirable for the person frequenting the cabinet because of the great variation in temperature from normal room temperature to the low freezing temperature maintained inside the cabinet.

Another type of commercial food storage cabinet arrangement consists in having a door leading from a room or other space maintained at room temperature whereby access may be had to the food locker without entering an extremely cold room. This latter type of food locker has the compartments arranged in tiers, there being mechanical equipment to shift the selected tier in position to the access door. This latter type of arrangement requires a large amount of space and considerable equipment for shifting a container to the access door.

The present invention overcomes the inherent disadvantages to both the above types of food storage cabinets of the lower freezer type and at the same time maintains the advantage of making it unnecessary for the user to enter a room of extremely low temperature.

An important object of the present invention is the provision of a food locker of the multiple container type whereby a plurality of banks of adjacent superposed containers or lockers may be arranged in a wall of the cabinet, access being had to a locker of a bank by means of a door leading from a room or other space maintained at room temperature directly to the storage lockers or containers, and at the same time preventing the containers, doors or drawers from becoming frosted to such an extent as to prevent proper operation of the containers, doors or drawers, or the locking mechanism therefor.

A further object of the invention is the provision of a food locker comprising an outer sealed cabinet having airtight access doors for access to a bank of food storage lockers, the bank of lockers being so positioned that air at an exceedingly low temperature will be circulated about the bank, the bank being spaced from the front of the cabinet to provide an air circulation space so that cold air will be blown across the front of the bank of containers to prevent frost from accumulating, and for causing any frost which may accumulate to be later dissipated.

A still further object of the invention is the provision of a food locker embodying an outer cabinet in which there are arranged in spaced relationship a plurality of banks of food lockers or containers, there being access doors arranged in the wall of the cabinet to permit access to each bank, the banks being so arranged as to permit a flow of cold air to be circulated continuously about the banks, the means for cooling and circulating the air being mounted on a removable door whereby the door and its mechanism may be removed in its entirety for the purposes of making repairs and adjustments thereto or for defrosting the mechanism, the opening being closed temporarily by a removable door or closure.

Still another object of the invention is the provision of a food storage locker comprising a plurality of banks or containers of locking members suitably arranged in a predetermined relationship so as to effect convenience, to conserve space, and to provide for proper and efficient cooling at low temperature.

Numerous other objects and advantages will be apparent throughout the progress of the following specification.

The accompanying drawings illustrate a selected embodiment of the invention and the views therein are as follows:

Fig. 3 is a detail plan section of a modified form of storage bank locker spacing;

Fig. 4 is a detail perspective view showing an end of the locker having a door upon which the refrigeration mechanism is mounted; and Fig. 5 is a detail perspective view of an end plug for closing the opening when the door carrying the refrigerating mechanism is removed or displaced so that the temperature within the cabinet may be maintained.

Figure 1:
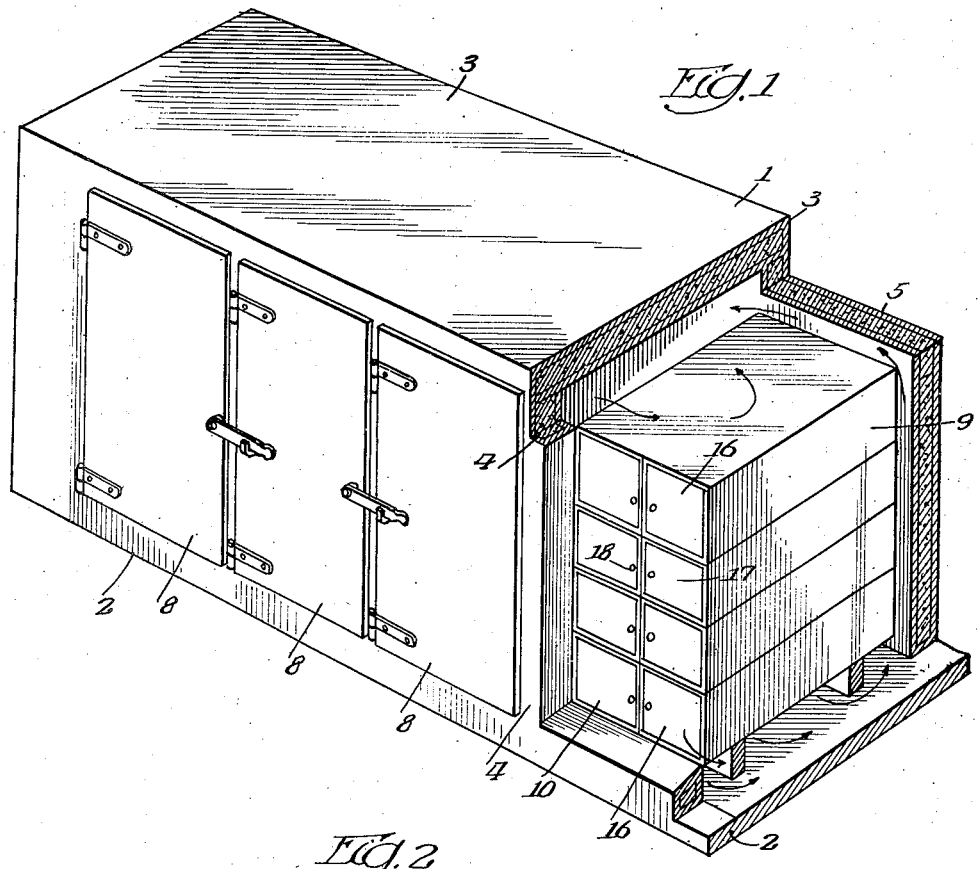
Fig. 1 is a detail perspective view of a food locker and embodying the invention, certain parts being broken away for the sake of clearness.

The particular food locker herein shown for the purpose of illustrating the invention comprises a cabinet body 1 having an insulated bottom 2 and an insulated top 3. Insulated front and rear walls 4 and 5 are arranged between the bottom and top walls 2 and 3 as clearly shown in Fig. 1. End walls 6 and 7 also suitably insulated complete the cabinet structure 1. The front wall 4 is provided with a plurality of spaced apart access doors 8 so that access may be had to a bank 9 of lockers or compartments arranged within the body of the cabinet 1.

Figure 2:
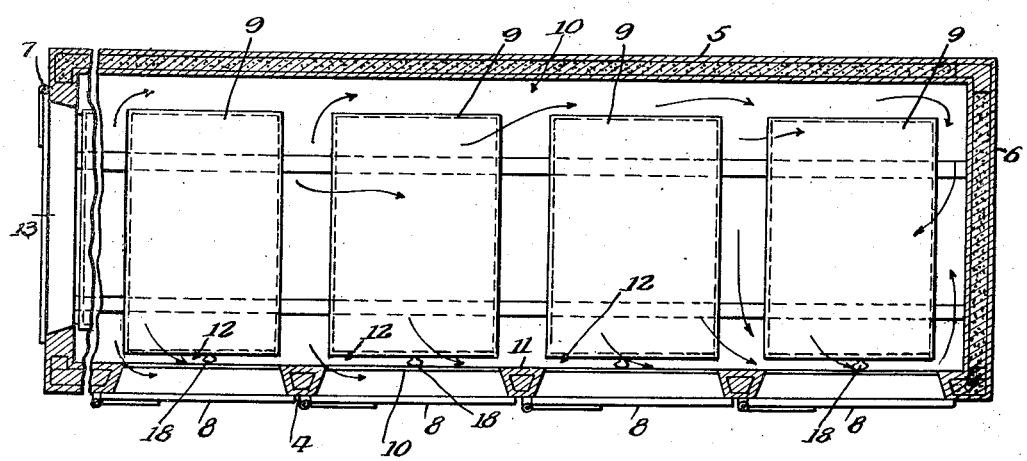
Fig. 2 is a detail horizontal plan sectional view of the locker shown in Figure 1.

Each bank 9, Figs. 1 and 2, are spaced apart to provide an air space therebetween. Also, the rear ends of each bank are spaced from the rear wall 5 to provide an air space therebetween. The bottom of each bank is raised from its insulated base 2 and the top of each bank is set a predetermined distance below the top, as clearly shown in Fig. 1, whereby air may pass completely about the banks.

The front side or surface 10 of each bank is spaced inwardly of the inside edge 11 of the front wall 4 to provide a sufficient space for the circulation of a draft of air across the front end of each bank.

It has been found in actual practice that by setting the front wall 10 of each bank a slight distance rearwardly so as to provide a slight space 12 between the inside edge 11 of the wall 4 and the front wall 10 of each bank, there will be sufficient air circulating across the front of the banks to dissipate any condensation of frost which may be deposited on the front of the banks.

One wall of the cabinet 1, the wall 7 shown in Figs. 1 to 4, is provided with an opening which is normally closed by a swinging door 13. This swinging door has mounted thereon refrigerating mechanism 14 including an evaporator, blower, air inlet, and other apparatus and equipment for cooling air to a very low temperature and blowing it within the interior of the cabinet.

The door 13 is so constructed that it may either be moved on its supporting hinges, or it may be removed entirely, for the purpose of making repairs and adjustments and for defrosting the evaporator. During the time repairs are made or the evaporator is being defrosted, the opening, which is normally closed by the door 13, may be closed by a solid filler plug-like member or door 15, Fig. 5, whereupon the cold air within the cabinet is prevented from raising in temperature during the time repairs or defrosting operations are made.

The arrangement of banks 9, shown in Fig. 3, consists in two banks arranged with their backs adjacent each other in a manner to provide a space between the back of each pair and also with the necessary spaces between the banks and the enclosing walls, including the top and bottom, so that air may circulate freely about each bank. The banks 9, shown in Fig. 3, are also spaced a predetermined distance away from the front wall so as to provide an air space 12 to carry off condensation. Each bank 9 may comprise a plurality of containers 16. These containers may be box-like structures closed by individual doors 17 having key controlled locks 18. If desired, the compartments 16 may comprise sliding drawers or each compartment may contain a container or receptacle in which the substance to be frozen is stored.

The invention provides a food storage locker construction including a very compact arrangement and having a completely insulated cabinet in which banks of compartments or lockers are arranged. Each bank is spaced a sufficient distance from each other and from adjoining walls so as to permit air to circulate freely about the banks. Also, the provision of spacing each bank a predetermined distance inwardly from the inside face of the front wall, prevents undue frosting, and such frost as may accumulate on the face of each bank is quickly and easily dissipated. The arrangement of mounting the refrigerating mechanism on a door which may be swung out of the way or entirely removed, permits repairs to be made and the evaporator to be defrosted without materially effecting in any way the temperature inside of the cabinet. Also, the arrangement is such that any person desiring access to a single locker of a bank may do so while remaining in room temperature without the necessity of entering an extremely cold room.

With this improved construction, the condensing equipment is located outside of the cabinet and in proximity thereto, with suitable flexible connections leading thereto from the apparatus on the door. The condenser and connections are of the conventional construction and type and are not shown.

Changes may be made in the form, construction and arrangement of the parts without departing from the spirit of the invention or sacrificing any of the advantages thereof, and the right is hereby reserved to make all such changes as fairly fall within the scope of the following claims.

The invention is hereby claimed as follows:

1. A food storage locker embodying a cabinet having an opening in a wall thereof, a closure for said opening, a food locker in said cabinet having its front face spaced a predetermined distance from the cabinet wall at the opening, said locker having its other faces spaced from the other walls of the cabinet, and means for circulating cold air through said spaces and across the face of the locker.

2. A food storage locker comprising a cabinet having an opening in a wall thereof, a closure for said opening to close the same, a food locker in said cabinet having its front face spaced a slight distance from the cabinet wall at the opening, said locker having its other faces spaced from the other walls of the cabinet, a second opening in a wall of said cabinet, a second closure for said second opening, and refrigerating means mounted on said second door and extending into the cabinet whereby the last named means may be removed from the interior of the cabinet to a position exterior thereof by shifting the second door from closed position.

3. A food storage locker embodying a cabinet having an opening in a wall thereof, a closure for said opening to close the same, and a bank of superposed containers arranged inside of the cabinet in spaced relation with the proximate enclosing walls thereof to provide an air space completely about the containers, the space between an enclosing cabinet wall and one face of a bank being less than the spaces between the other cabinet walls and the other faces of the bank.

4. A food storage locker embodying a cabinet having an opening therein, means to circulate cold air inside of the cabinet, a bank of lockers arranged therein and adjacent the opening, the front face of the bank being spaced a predetermined distance from an inner face of a wall of the cabinet to provide a space between the front face of the bank and the adjacent cabinet wall whereby cold air may be circulated across the said front face of the lockers, and a door for closing the opening.

HAROLD E. WHEELER.
DAVID A. FORBERG.

REFERENCES CITED

The following references are of record in the file of this patent:

UNITED STATES PATENTS

| Number | Name | Date |
| --- | --- | --- |
| 2,028,046 | Calatroni | Jan. 14, 1936 |
| 2,089,608 | Horlacher | Aug. 10, 1937 |